March 6, 1934.  S. A. LOVE  1,949,804
RAZOR BLADE SHARPENER
Filed June 22, 1931
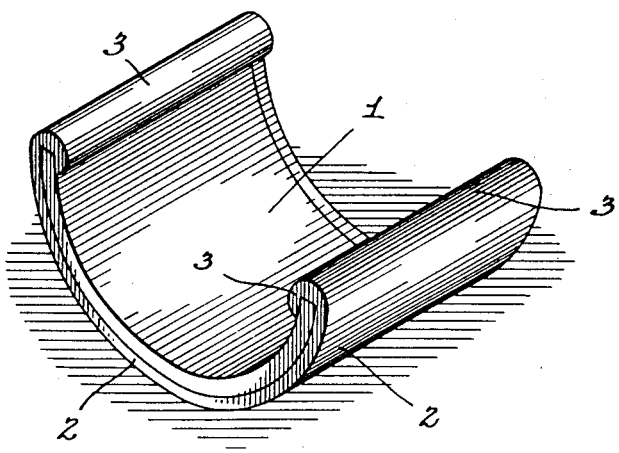
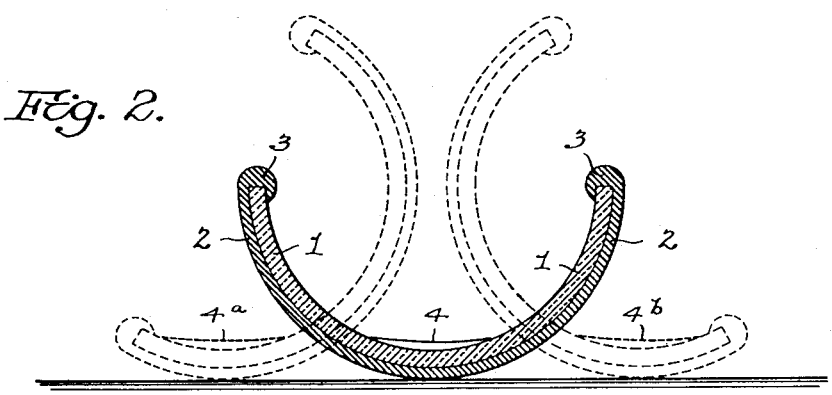
Inventor
SOLOMON A. LOVE
By Mason Fenwick Lawrence
Attorneys Patented Mar. 6, 1934

1,949,804

UNITED STATES PATENT OFFICE 1,949,804

RAZOR BLADE SHARPENER

Solomon A. Love, Decatur, Ga.

Application June 22, 1931, Serial No. 546,111

1 Claim. (Cl. 51—211)

This invention relates to razor blade sharpeners of that type which are adapted for use in the sharpening of blades of the flexible, double-edged variety.

The object of the invention is to so construct such a sharpener that it will be economical to manufacture, simple in construction, easy to operate, and effective in result.

This object is attained in the manner hereinafter set forth, reference being had to the accompanying drawing, wherein:

Figure 1 is a perspective view of a razor blade sharpener embodying the features and constructed in accordance with this invention, and Figure 2 is a vertical sectional view of the same.

Briefly stated, the sharpener consists of a semi-cylindrical sheet 1 of heavy glass to the outer or convex face of which is secured or applied a covering 2 of rubber or similar resilient material, the ends of this covering 2 preferably overlapping the ends of the glass sheet 1 as illustrated at 3 in the drawing.

In operation, the sharpener, takes advantage of the well known fact that, when the edge of a thin and flexible razor blade is pressed against the surface of a smooth sheet of glass and briskly drawn across the same, the microscopic jagged teeth at the edge of the blade will be pressed into alignment, being "ironed out", as it were. Inasmuch as the jaggedness or disalignment of these microscopic teeth at the edge of a blade are the primary cause of a dull condition, this aligning or "ironing out" of the teeth very effectively serves to restore the original keen cutting edge thereto.

When a blade is to be sharpened with the present invention the device is set upon a table or other level supporting surface, as shown in Figure 2 of the drawing, with its outer, convex rubber covered face resting thereon. The blade 4 is then placed within the device, extending transversely across its inner concave surface. The blade is then pressed down, firmly, against the glass, by the forefinger of the operator, and rapidly moved to and from, sideways, to the extremes indicated at 4$^a$ and 4$^b$, a firm downward pressure being maintained throughout the operation.

The grip of the rubber covering 2 upon the supporting surface will overcome any tendency which the device might have to slide, and it will rock, from side to side, to the extremes indicated by dotted lines in Figure 2, with the result that the blade, as it is moved, will be drawn across the face of the glass and the desired "ironing out" or stropping effect will be achieved. A few brisk strokes of the blade, with one face uppermost, followed by a few more brisk strokes with the blade reversed and its other face uppermost, will be found to have very efficiently restored very keen edges to a previously dull and useless blade.

Thus it will be seen that there are no moving or mechanical parts of the sharpener to get out of order and that no especial skill is required in its use, a few moments practice being sufficient to enable any one to use the sharpener with satisfactory and gratifying results.

The rubber covering of the glass sheet may be either smooth or corrugated on its outer face, as desired, and it may be cemented or otherwise firmly affixed thereto, or entirely separate and maintain its position solely by frictional grip.

Other obvious changes in detail will readily suggest themselves. For example, the glass sheet may be in the form of a mirror, or it may be transparent and have printed directions or other reading matter underneath.

What I claim is:

A razor blade sharpener comprising: a concave-convex sheet of glass having its opposite straight ends parallel to the axis of said sheet, an outer covering of resilient material of substantially the same width as said sheet and having its ends grooved to receive the said straight ends of the sheet of glass, said covering being shorter between the opposite walls of its grooved ends than the length of said sheet, whereby the cover may be sprung over the convex face of said sheet to be held thereon by the resilience of said material.

SOLOMON A. LOVE.